United States Patent
Fuse et al.

[11] Patent Number: 5,889,626
[45] Date of Patent: Mar. 30, 1999

[54] METHOD AND DEVICE FOR FOCUSING LASER BEAM

[75] Inventors: Keiji Fuse; Keiji Ebata, both of Osaka, Japan

[73] Assignee: Sumitomo Electric Industries, Ltd., Osaka, Japan

[21] Appl. No.: 614,476

[22] Filed: Mar. 13, 1996

[30] Foreign Application Priority Data

Mar. 15, 1995 [JP] Japan ................................ 7-055931

[51] Int. Cl.$^6$ ................................................ G02B 5/10
[52] U.S. Cl. .................... 359/858; 359/365; 359/859; 359/201; 359/208
[58] Field of Search .................... 359/858, 365, 359/730, 859, 201, 208; 372/95, 98, 99, 101

[56] References Cited

U.S. PATENT DOCUMENTS

| | | | |
|---|---|---|---|
| 4,396,285 | 8/1983 | Presta et al. | 356/138 |
| 4,458,302 | 7/1984 | Shiba et al. | 359/365 |
| 5,089,915 | 2/1992 | Gobeli | 359/868 |
| 5,420,882 | 5/1995 | Black | 372/99 |

FOREIGN PATENT DOCUMENTS

| | | |
|---|---|---|
| 0 065 785 | 12/1982 | European Pat. Off. . |
| 0 110 231 | 6/1984 | European Pat. Off. . |
| 0 371 781 | 6/1990 | European Pat. Off. . |
| 1154711 | 9/1963 | Germany ................................ 359/858 |

OTHER PUBLICATIONS

J.A. Murphy, *International Journal of Infrared and Millimeter Waves*, 8(9), 1165–1187 (1987).

N. Schuster, *Feinwerktechnik & Messtechnik*, 99(10), 433–435 (1991).

*Primary Examiner*—Cassandra Spyrou
*Assistant Examiner*—Mohammad Y. Sikder
*Attorney, Agent, or Firm*—Wenderoth, Lind & Ponack, L.L.P.

[57] ABSTRACT

A laser beam condensing device which can be manufactured at low cost by using reflecting mirrors which can be machined at low cost. The device is capable of condensing a laser beam to a high energy density while eliminating any optical path difference, even if the optical axis of the incident beam strays. This device includes a first and a second reflecting mirror. An incident laser beam is deflected by these mirrors in the same direction. One of the two mirrors is a toroidal mirror, while the other is a spherical, cylindrical or toroidal reflecting mirror. The mirror surfaces of the two reflecting mirrors are machined so that the second reflecting mirror can cancel out any wave front aberrations of the laser beam reflected by the first reflecting mirror.

6 Claims, 8 Drawing Sheets

FIG. 1

FIG. 2A $r_x \neq r_y$

FIG. 2B $r_x = r_y$

FIG. 2C $r_x = \infty$

FIG. 5A  Spherical

FIG. 5B  Toroidal

FIG. 5C  Combination

FIG. 6A  Cylindrical

FIG. 6B  Toroidal

FIG. 6C  Combination

FIG. 7A  Toroidal

FIG. 7B  Toroidal

FIG. 7C  Combination

FIG. 8

METHOD AND DEVICE FOR FOCUSING LASER BEAM

BACKGROUND OF THE INVENTION

This invention relates to a laser beam condensing optical device used for laser beam machining, and particularly to a method and a device for focusing or condensing a laser beam on a focal point.

Today, with the appearance of lasers capable of generating high-energy laser beams, such as $CO_2$ lasers, YAG lasers and excimer lasers, it is possible to cut, weld and surface-treat different kinds of materials by laser beam machining. Such laser beam machining is carried out by guiding a laser beam generated by a laser beam generator through a laser beam guide means to a machining head, condensing the laser beam to a high energy density with a beam condensing optical device in the machining head, and irradiating a workpiece with the thus condensed laser beam.

This beam condensing optical device usually includes condensing lenses and off-axis parabolic mirrors as main optical parts. Condensing lenses are condensing means of a type adapted to bend light beams by passing them. They are optical parts made of ZnSe (zinc selenide), which is a compound semiconductor material, and have a plano-convex or meniscus shape.

ZnSe is a material which is particularly low in its infrared-absorbing power. Thus, it is widely used as the material for the lenses in $CO_2$ lasers which generate infrared laser beams. But it is impossible to completely prevent the absorption of infrared light. Thus, a ZnSe lens tends to heat up by absorbing energy when a laser beam passes therethrough. This may cause thermal deformation of the condensing lens, a change in its refractive index, or a shift in the focal point, resulting in a reduction in the quality of the condensed beam.

The higher the laser output, the more conspicuously these phenomena will appear. If this condensing lens is used in an environment where its surface tends to be stained with dirt, the dirt itself will absorb laser beam energy, accelerating a temperature rise of the lens, so that the above phenomena will appear still more conspicuously. In the worst case, the lens might burn out.

Thus, such a condensing lens has to be cooled by circulating cooling water along its sides or by spraying a cooling gas on the lens surface. But with any cooling method, it is difficult to efficiently cool the central portion of the lens. Thus, such a lens can be used only in comparatively low-output laser beam machining such as for cutting a thin plate.

A parabolic mirror has a reflective surface in the shape of a paraboloid, a kind of axisymmetric aspheric surface. It is a reflective type of condensing means which utilize the principle that a parallel beam incident on a paraboloid is condensed while creating no aberration. Such a parabolic mirror can reflect and focus a laser beam with no aberration, if the incident laser beam has an optical axis strictly parallel to the axis of the parabolic surface and also is a strictly parallel beam with no divergence or focusing.

Since a parabolic mirror focuses a laser beam by reflecting it rather than by passing and bending it, it is possible to cool the mirror from its back with high efficiency. For example in a high-output $CO_2$ laser, it is possible to cool such a mirror with high efficiency by forming its backside from a material having a high thermal conductivity such as copper and circulating cooling water along the back of the mirror. For this reason, parabolic mirrors are frequently used in applications where high-output laser energy is needed such as laser beam welding and laser beam surface treatment.

Theoretically, a parabolic mirror can condense a laser beam to a diffraction limit with no aberration. But actually, an incident laser beam necessarily has a divergence angle, so that its optical axis (and thus its incident angle) may tilt more or less. If this happens, the quality of the condensed beam drops markedly. Thus, in order to focus a laser beam with a parabolic mirror, the optical axis of the incident laser beam has to be adjusted with a high degree of accuracy. This work is difficult with a conventional device.

Even if the optical axis is initially adjusted with a high degree of accuracy, a tilt in the optical axis can occur if any optical element in the condensing device should shift or if the operation of the laser beam generator or the laser beam transmitter becomes unstable. This leads to reduced beam-condensing properties of the condensing device. This in turn detrimentally affects the laser beam machining efficiency. If this happens, it is sometimes necessary to stop the entire device in order to readjust the optical axis.

Off-axis parabolic mirrors, which are used in many laser beam condensing optical devices, have a smooth mirror surface having small surface roughness and an accurate parabolic shape. Such a surface is formed by Single-Point Diamond Turning (hereinafter called SPDT) using a diamond cutting tool and an ultraprecise lathe.

To form a non-off-axis parabolic concave reflecting mirror such as a spherical mirror by SPDT, a mirror material is machined with a cutting tool by clamping it to the rotation center of a lathe spindle. To form an off-axis parabolic mirror, which is a part of a paraboloid of revolution, a mirror material is machined with a cutting tool by clamping it to the lathe at a point spaced a predetermined distance from the spindle axis.

Thus, it is extremely difficult to form such a parabolic mirror with high precision because the cutting tool tends to break due to unstable rotation of the spindle and/or intermittent cutting. Also, the off-axis distance is limited by the machining diameter of the ultraprecise lathe, so that it is impossible to machine a parabolic mirror having a long off-axis distance, i.e. a long focal distance.

An object of this invention is to provide a method and device for condensing a laser beam which uses non-parabolic reflecting mirrors to obviate the above problems associated with parabolic mirrors. With the method and device the beam can be sufficiently and stably condensed while maintaining a long focal distance, and there is no need for SPDT machining to provide an off-axis reflecting surface and a long focal distance.

SUMMARY OF THE INVENTION

According to this invention, there is provided a method of condensing a laser beam comprising the steps of reflecting an incident laser beam with a first concave reflecting mirror, and reflecting the thus reflected laser beam with a second concave reflecting mirror in the same direction, the first and second reflecting mirrors having such reflecting curved surfaces formed that any optical path difference of the laser beam reflected by the first reflecting mirror is canceled out by the second reflecting mirror, whereby the laser beam reflected by the second reflecting mirror has a minimum wave front aberration.

As the device for carrying out this method, there is provided a laser beam condensing device comprising a first reflecting mirror and a second reflecting mirror having concave reflecting surfaces, the first and second mirrors being combined to deflect a laser beam in the same direction, one of the first and second mirrors being a toroidal mirror, while the other mirror being one of a spherical, a cylindrical and a toroidal mirror, the first and second reflecting mirrors having such reflecting surfaces formed that any optical path difference of the laser beam reflected by the first reflecting mirror is canceled out by the second reflecting mirror.

In the method according to the invention, the incident laser beam is reflected by two concave reflecting mirror by predetermined angles in the same direction, thereby substantially canceling out any optical path difference of the laser beam reflected by the first reflecting mirror. But only with this arrangement, it is difficult to completely cancel out such an optical path difference.

Thus, the reflecting surfaces of the two mirrors are adjusted to completely cancel out such an optical path difference and thus to minimize the wave front aberration of the laser beam reflected by the second reflecting mirror. More specifically, the radii of curvature of the two mirrors are adjusted to determine the focal point by combination of two mirrors and to minimize the wave front aberration.

The two reflecting mirrors of the beam condensing device according to the invention are adjusted to provide such radii of curvature and deflection angles and directions that can carry out the method of the invention. The radii of curvature is finely adjusted to minimize the wave front aberration of the laser beam reflected by the second reflecting mirror.

One of the two reflecting mirrors is a toroidal mirror, while the other is a spherical mirror, a cylindrical mirror or a toroidal mirror. These mirrors can be formed easily without using off-axis SPDT machining.

The radii of curvature of these reflecting mirrors are not limited by the off-axis distance as in the case of parabolic mirrors. Namely, it is possible to determine such radii of curvature within a wide range of from several hundred millimeters to several tens of meters. It is thus possible to provide a laser beam condensing device having a sufficiently long focal distance.

In calculating the radii of curvature that minimize the wave front aberration, if the first and second reflecting mirrors are arranged so as to deflect the laser beam in the same direction, both mirrors should be concave mirrors to minimize the wave front aberration. If they are arranged to deflect the laser beam in different directions, it is necessary to use a convex mirror as one of the two reflecting mirrors while using a concave mirror as the other reflecting mirror. Otherwise, it would be difficult to cancel out the wave front aberration.

If a convex mirror is used as the first reflecting mirror and a concave mirror as the second reflecting mirror, the incident laser beam will diverge when reflected by the first reflecting mirror, and condensed by the second reflecting mirror. Thus, the numerical aperture at the image side of the condensing device will increase, so that it is possible to reduce the focusing spot diameter to a considerable degree.

But with this arrangement, the beam condensing properties tends to drop due to a tilt in the optical axis of the incident laser beam as markedly as or even more sharply than when a parabolic mirror is used.

In contrast, the condensing device comprising two concave reflecting mirrors exhibits a high beam condensing properties while keeping the wave front aberration to a minimum. Such a device can condense a laser beam to a condensing spot diameter that is near to the diffraction limit in an ideal state of a parabolic mirror. By using a spherical mirror, a cylindrical mirror or a toroidal mirror, it is possible to prevent a sharp drop in the beam condensing properties due to a tilt in the optical axis as in the case of a parabolic mirror. Thus, it is possible to stably keep the beam condensing properties at a high level.

Other features and objects of the present invention will become apparent from the following description made with reference to the accompanying drawings, in which:

DETAILED DESCRIPTION OF THE PREFERRED EMBODIMENT

Now, with reference to the drawings, the embodiments of the present invention is described.

Figure 1:
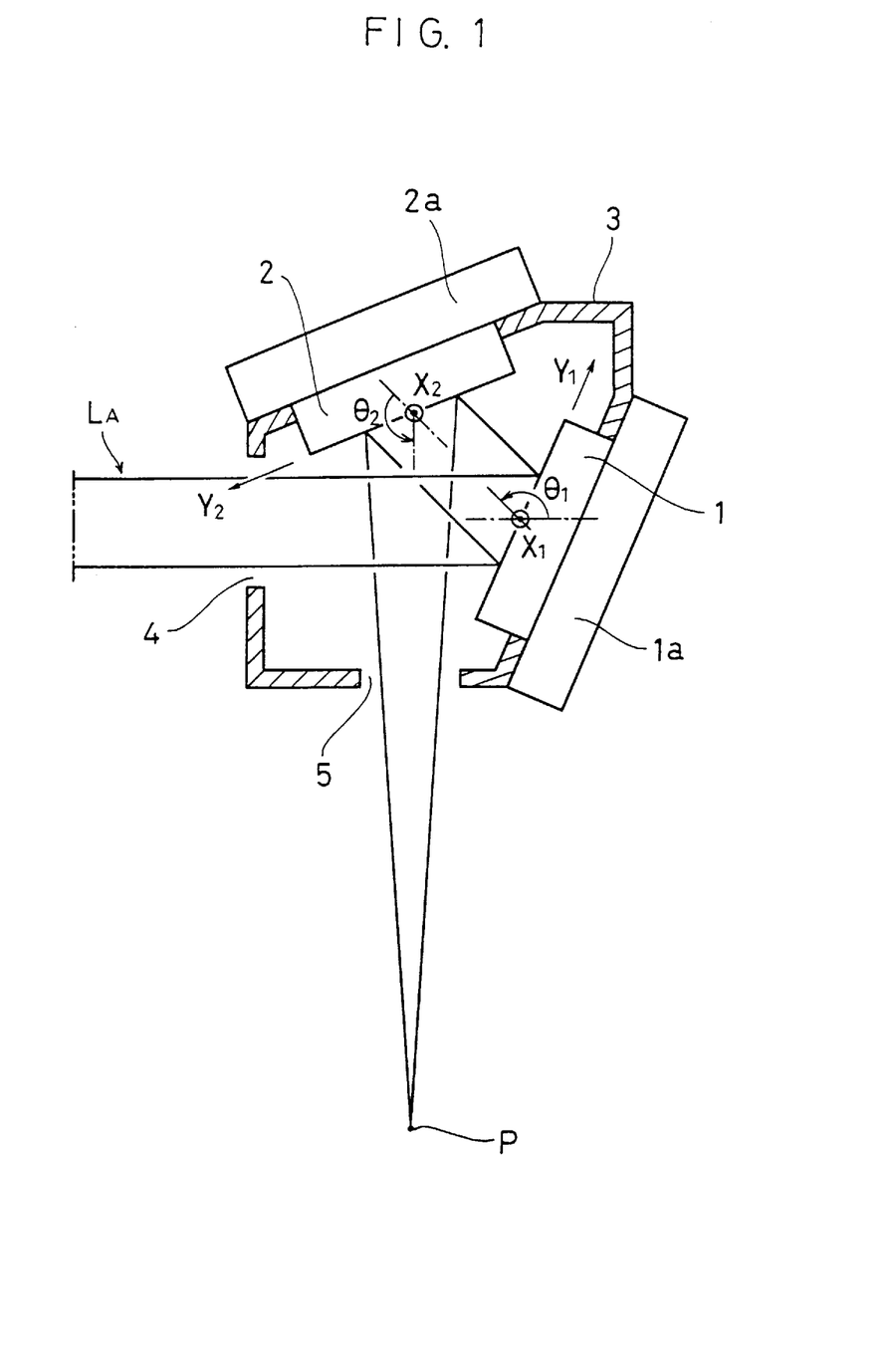
FIG. 1 is a sectional view of a laser beam condensing device of a first embodiment of the present invention.

FIG. 1 is a sectional view of a beam-condensing optical device embodying the invention. It has a first reflecting mirror 1, a second reflecting mirror 2, a casing 3, a light-incoming opening 4, and a light-outgoing opening 5. While not shown, a laser generator and means for guiding the laser beams generated by the laser generator to the optical device are provided on the lefthand side of the optical device. But since they are not part of the present invention, their description is omitted.

The laser beam $L_A$ is projected into the optical device, is reflected by the first reflecting mirror 1 and the second reflecting mirror 2, and then leaves the device through the outgoing opening 5. The first reflecting mirror 1 and the second reflecting mirror 2 are combined so that the laser beam is focused on a focal point P.

More specifically, the laser beam $L_A$ is deflected counterclockwise by an angle $\theta 1$ and $\theta 2$ by the reflecting mirrors 1 and 2, respectively, whereas its axis is deflected clockwise by the mirrors 1 and 2. In the example shown, the angles $\theta 1$ and $\theta 2$ are both 135° but may be of different values.

The first reflecting mirror 1 and the second reflecting mirror 2 both have concave reflecting surfaces. Namely, their reflecting surfaces are not convex. Also, one of the reflecting mirrors is a toroidal reflecting mirror, while the other is one of a toroidal, a spherical and a cylindrical mirror. Namely, neither of the mirrors is a parabolic mirror.

Of the above combinations, the most desirable is the combination of two toroidal reflecting mirrors. The second best combination is the toroidal-spherical mirror combination. The third best combination is a toroidal-cylindrical one. We will later explain why these combinations are preferable.

Figures 2A, 2B, 2C:
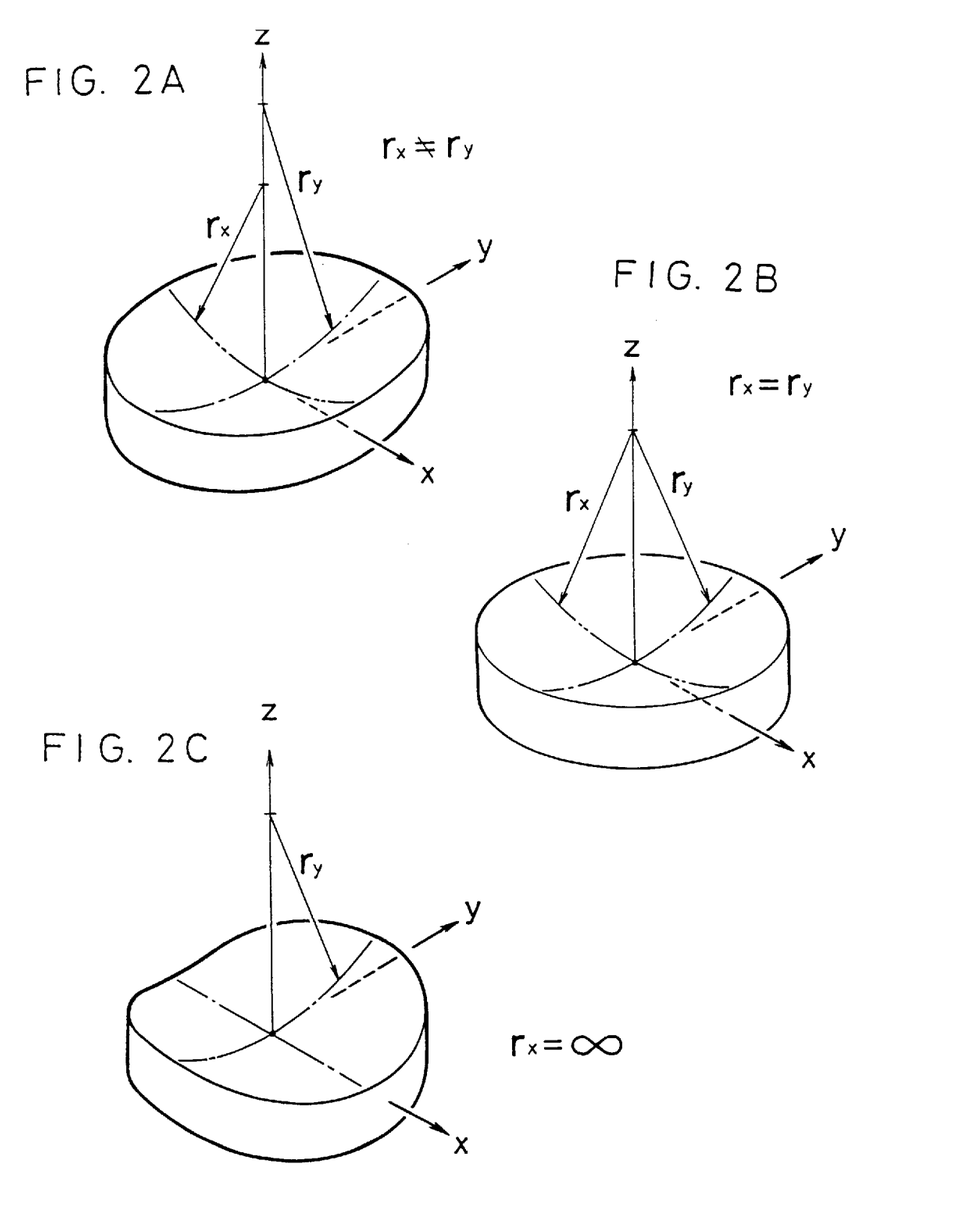
FIGS. 2A, 2B and 2C are schematic views of a toroidal, a spherical and a cylindrical reflecting mirror, respectively.

FIGS. 2A, 2B and 2C schematically show a toroidal, a spherical and a cylindrical reflecting mirror, respectively. As shown, a toroidal surface (FIG. 2A) has different radii of curvature $r_x$ and $r_y$ along its X-axis and Y-axis. A spherical surface (FIG. 2B) is part of a complete sphere, the radii of curvature $r_x$ and $r_y$ being equal to each other. A cylindrical surface (FIG. 2C) has a radius of curvature $r_y$ and an infinite radius of curvature $r_x$.

If a non-toroidal mirror is selected as one of the first and second reflecting mirrors, it is preferably used as the first reflecting mirror. That is, the second reflecting mirror is preferably a toroidal one. We will later explain why.

Now the operation of this embodiment is described.

Figure 3A:
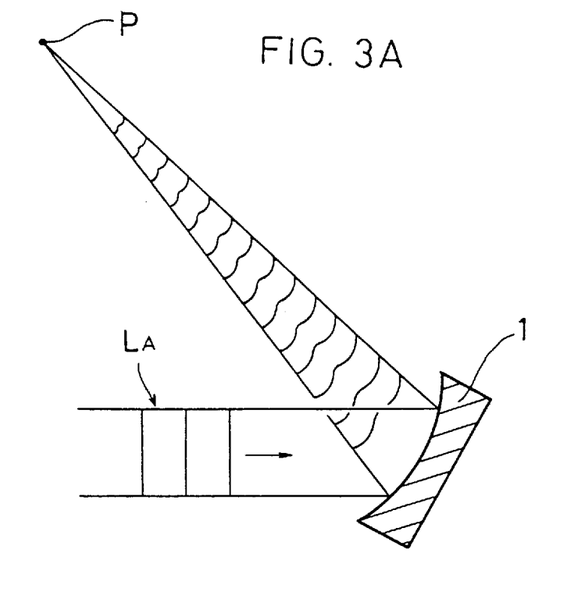
FIGS. 3A, 3B and 3C are views illustrating the operation of the condensing device shown in FIG. 1.

FIG. 3A shows how the laser beam $L_A$ is focused by a concave reflecting mirror. The beam used here is a plane wave (with zero wave front aberration). If the laser beam $L_A$ were reflected by a parabolic reflecting mirror and focused on the focal point P, it would form complete spherical waves with zero wave front aberration. But if it is reflected by a toroidal, spherical or cylindrical reflecting mirror as in the embodiment, no complete spherical waves can be formed. This is because the wave surfaces are deformed due to an optical path difference created by the reflecting surface.

Figure 3B:
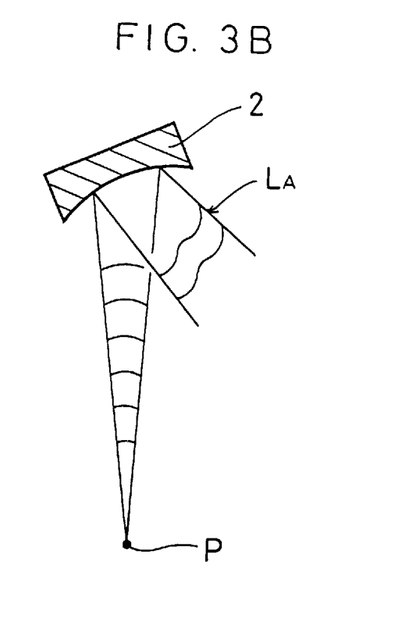
Figure 3C:
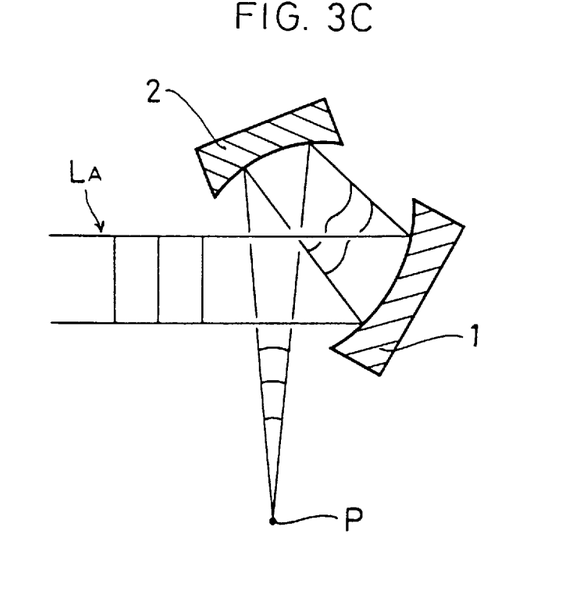

In this embodiment, the laser beam reflected by the first reflecting mirror 1 is reshaped or corrected so that the above mentioned optical path difference and wave front aberration will be zero, by using a reflecting mirror having a mirror surface as shown in FIG. 3B as the second reflecting mirror 2. Thus, the laser beam can be focused on the focal point P in the form of complete spherical waves as shown in FIG. 3C.

By using a toroidal reflecting mirror as one of the two reflecting mirrors, it is possible to correct the optical path difference created by the other reflecting mirror both in the X-axis and Y-axis directions. For example, if a spherical or cylindrical reflecting mirror is used as the first reflecting mirror 1 and a toroidal mirror is selected as the second reflecting mirror 2, different optical path differences will be created along the X-axis and Y-axis by the first reflecting mirror, because the laser beam is deflected by different angles along the X-axis and Y-axis of the spherical or cylindrical concave surface.

By using a toroidal reflecting mirror as the second reflecting mirror 2, it is possible to cancel or counteract the optical path differences both along the X- and Y-axes. By deflecting the laser beam with the second reflecting mirror 2 in the same direction in which the laser beam is deflected by the first reflecting mirror 1, the optical path differences can be eliminated macroscopically. But microscopically, this is not enough to eliminate optical path differences.

In order to microscopically correct the optical path differences, it is necessary to precisely adjust the two radii of curvature of the mirror surface of the toroidal reflecting mirror. In calculating the radii of curvature that can minimize the optical path differences it is advantageous to use a torodal reflecting mirror as the second reflecting mirror. But this is not an essential requirement. The toroidal reflecting mirror may be used as the first reflecting mirror. In the latter case, the curvature of the surface of the first reflecting mirror 1 is adjusted so that the optical path differences of the laser beam reflected by the second reflecting mirror will be at a minimum.

If a spherical mirror is selected as the first reflecting mirror 1 and a toroidal reflecting mirror is used as the second reflecting mirror 2, the laser beam will be reflected symmetrically by the spherical first reflecting mirror on both sides of the vertical plane including both the incoming laser beam and the reflected laser beam. But along this vertical plane, the laser beam is not reflected symmetrically, because a large optical path difference corresponding to the deflecting angle of the first mirror is present in this direction. But it is possible to cancel this optical path difference and thus to minimize the wave front aberration of the laser beam when it reaches the focal point by adjusting the deflecting angle and the radii of curvature of the toroidal second reflecting mirror.

The toroidal surface that can minimize the optical path difference is obtained in the following manner.

First, to calculate the radii of curvature that can minimize the optical path difference, the following two aspects have to be considered. First, the surfaces of the reflecting mirror have to be shaped such that the split laser beam can be focused on the focal point. Second, the radii of curvature have to be determined so that the wave front aberration of the laser beam will be minimum when it is focused on the focal point P.

To evaluate the first requirement, a light ray is passed through each of a plurality (n) of divided sections of the laser beam as shown in FIG. 4. Then, the n-th ray is tracked down to find out the point at which this ray intersects the focal plane. The radii of curvature of the first and second reflecting mirrors are adjusted to minimize the distance Δn between the above point of intersection and the focal point P. Actually, in order to make such adjustment for all the rays, the following evaluation formula is used.

$$E = \sum_{n=1}^{N} \Delta_n^2$$

The radii of curvature of the mirrors are adjusted so that the value E will be at a minimum. If greater importance is to be placed on the portion of the beam nearer to its center, the following formula is used.

$$E = \sum_{n=1}^{N} w_n \Delta_n^2$$

wherein Wn is the weight for each ray.

To fulfill the second requirement, the following formula is considered for each of the divided rays (N in number).

$$A = \sum_{n=1}^{N} w_n L_n^2$$

wherein Ln is the optical path difference of each ray shown in FIG. 4. The radii of curvature are selected so as to minimize the value A.

The radii of curvature that can minimize the above values E and A are calculated in the following manner. Suppose the first and second reflecting mirrors are both spherical mirrors. The evaluation function E is a function of the radius of curvature $r_1$ of the first reflecting mirror and the radius of curvature $r_2$ of the second reflecting mirror.

$$E = E(r_1, r_2)$$

(A) A fixed value is assigned to $r_1$. A large value $r_2 + \Delta r_2$ is assigned to $r_2$. As the value E increases, the value $r_2$ is set to a smaller value $r_2 - \Delta r_2'$. This is repeated to calculate $r_2 = r_2(1)$ that gives a minimum E.

(B) With the value $r_2$ set at $r_2 = r_2(1)$, $r_1$ is varied. That is, $r_1$ is increased to $r_1 + \Delta r_1$ and reduced to $r_1 - \Delta r_1'$ as the value E increases. This is repeated to calculate $r_1 = r_1(1)$ that gives a minimum E.

After substituting $r_1$ (1) calculated in (B) for $r_1$, the operation (A) is carried out again to obtain $r_2=r_2$ (2). The operations (A) and (B) are repeated several times to find out $r_1=r_1$ (0) and $r_2=r_2$ (0) that give a minimum value of E.

Figures 4A, 4B:
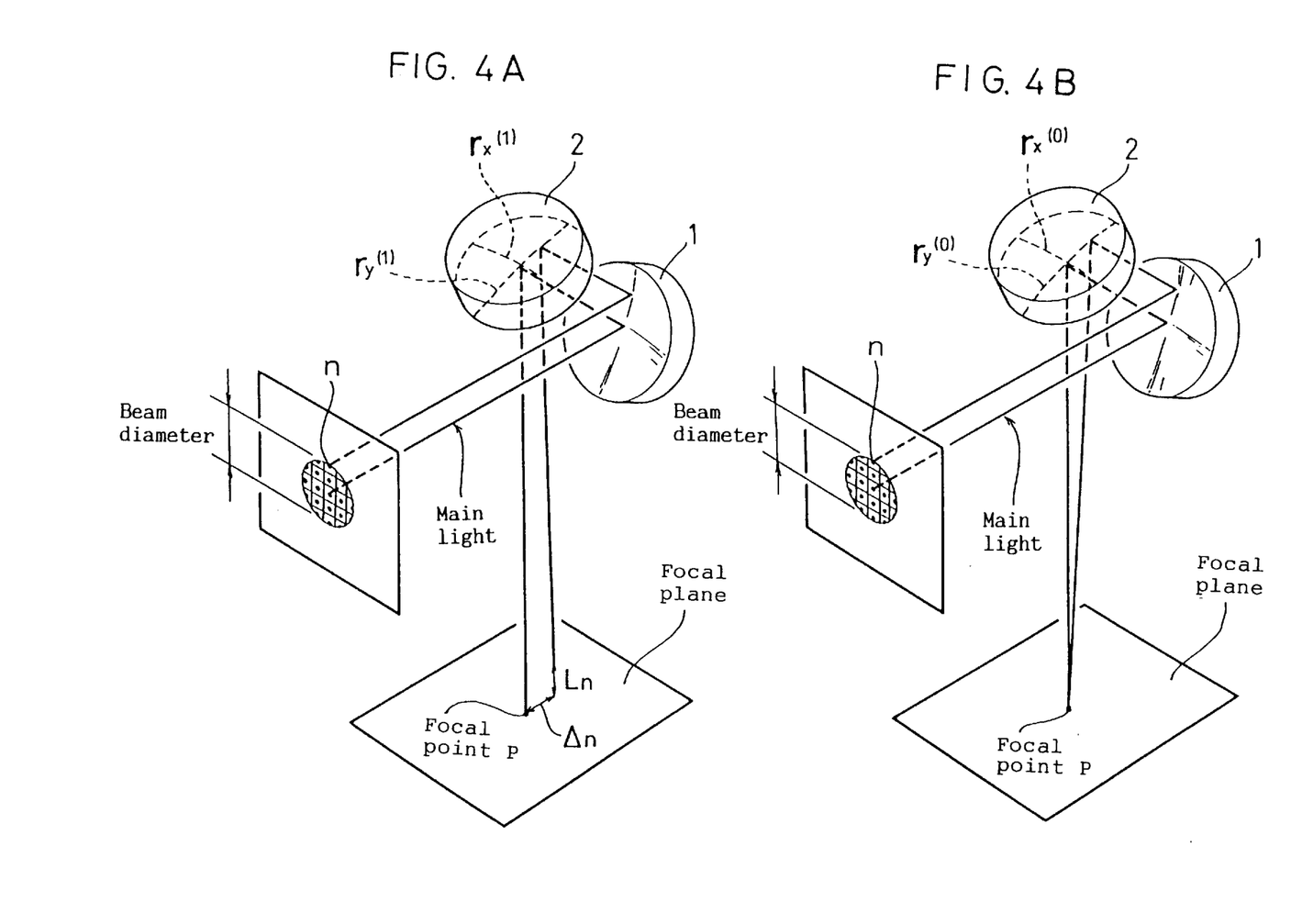
FIGS. 4A and 4B are views showing how the reflecting surface shapes of the reflecting mirrors that minimize the wave front aberration are determined by calculation.

In the above example, the first and second reflecting mirrors are both spherical mirrors. But in the embodiment of the present invention, one of the mirrors has to be a toroidal reflecting mirror. If the toroidal mirror is used as the second reflecting mirror, $E=E(r_x, r_y, r_1)$, $A=A(r_x, r_y, r_1)$. For these variables $r_x, r_y$ and $r_1$, $r_x(0), r_y(0)$ and $r_1$ that give a minimum E are obtained in the above manner. FIG. 4 schematically show the paths of each ray at the beginning and end of this calculation. FIG. 4B shows the state where $\Delta n$ and Ln shown in FIG. 4A are at a minimum. In this state, all the rays are focused on the focal point P with the wave front aberration reduced to a minimum.

In this way, $r_x(0), r_y(0)$ and $r_1$ that minimize the wave front aberration are obtained. The minimum wave front aberration is preferably adjusted to within $\lambda/2$, where $\lambda$ is the wavelength of the laser beam. For example, a $CO_2$ laser beam has a wavelength of 10.6 $\mu$m. If the first reflecting mirror 1 and the second reflecting mirror 2 are toroidal mirrors, their reflecting surfaces may be adjusted e.g. as shown below.

focal length: f=254 mm
radii of curvature:
No. 1: $r_x$=786.9 mm (concave)
$r_y$=921.5 mm (concave)
No. 2 $r_x$=1487.4 mm (concave)
$r_y$=1750.8 mm (concave)

FIGS. 5, 6 and 7 show the wave front aberrations of the laser beam when a toroidal mirror is combined with a spherical, a cylindrical and a toroidal mirror, respectively. The reflecting mirrors used here have different surface dimensions from two toroidal mirrors shown immediately above. For example, they have a focal length f=500 mm and a beam diameter of 35 mm.

Figure 5A:
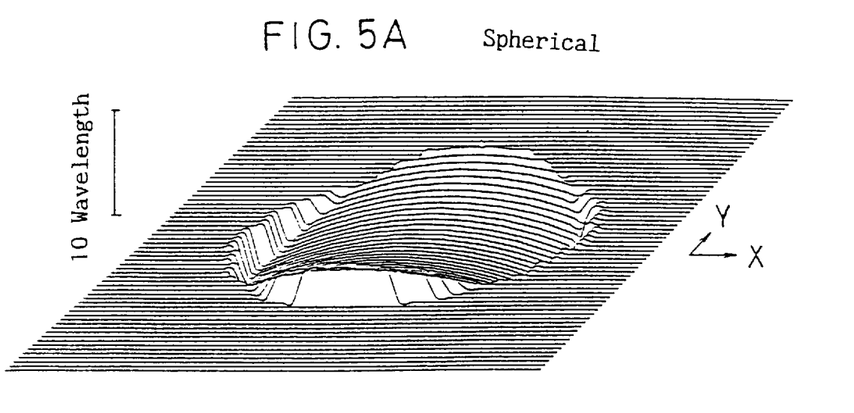
FIGS. 5A–5C show distributions of wave front aberrations of a laser beam reflected by the combination of a spherical and a toroidal reflecting mirror.
Figure 5B:
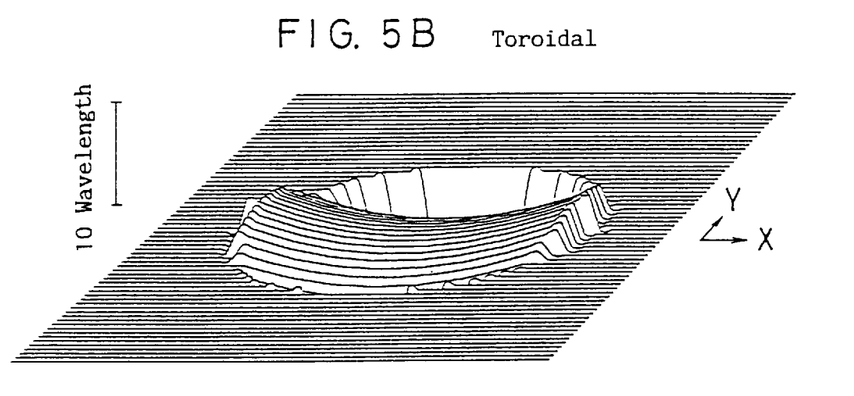
Figure 5C:
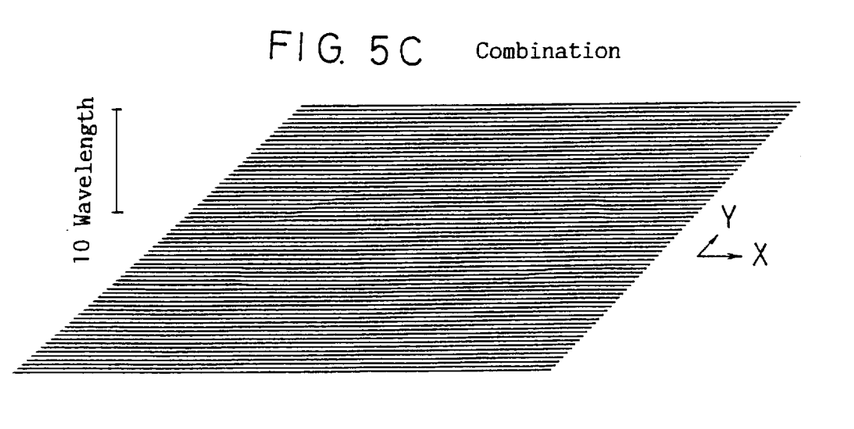

FIG. 5 shows wave front aberrations when a toroidal reflecting mirror is combined with a spherical reflecting mirror. More specifically, FIGS. 5A and 5B show wave front aberrations caused by the spherical reflecting mirror only, and those by the toroidal reflecting mirror only, respectively. FIG. 5C shows that by combining these two reflecting mirrors, wave front aberrations are reduced to zero.

FIG. 5A shows, not the section of the laser beam LA at the focal point P, but a section of an imaginary laser beam produced by a laser point-source located at the focal point P and having a completely spherical wave. More specifically, this figure shows the distribution of wave front aberrations of this laser beam as viewed in cross-section at a parallel portion of this laser beam after being reflected by the spherical reflecting mirror. The parallel portion of this beam has an entrance pupil diameter of 76.2 mm, which is the diameter of the substantially oval wave front aberration shown in FIG. 5A. The stripes around the oval portion represent a reference surface having a zero wave front aberration.

FIG. 5B shows the distribution of wave front aberrations if such an imaginary laser beam were reflected by the toroidal reflecting mirror only. If this laser beam were reflected by both of these reflecting mirrors, a plane wave with a zero wave front aberration as shown in FIG. 5C would be obtained. Thus, by reflecting the plane-wave laser beam $L_A$ with a zero wave front aberration with these two reflecting mirrors, as shown in FIG. 1, it is possible to focus the laser beam having a spherical wave with a zero wave front aberration on the focal point.

Figure 6A:
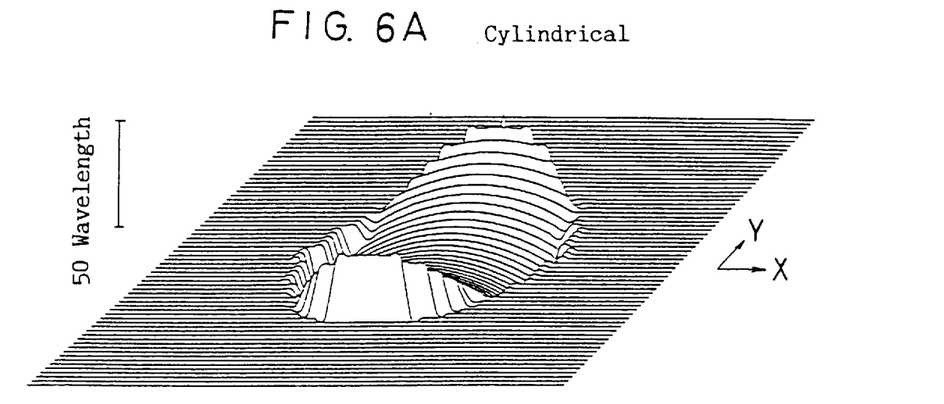
FIGS. 6A–6C show distributions of wave front aberrations of a laser beam reflected by the combination of a cylindrical and a toroidal reflecting mirror.
Figure 6B:
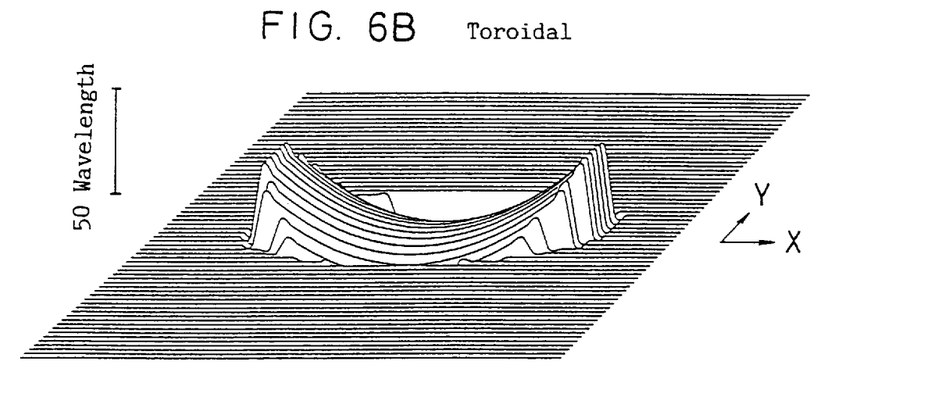
Figure 6C:
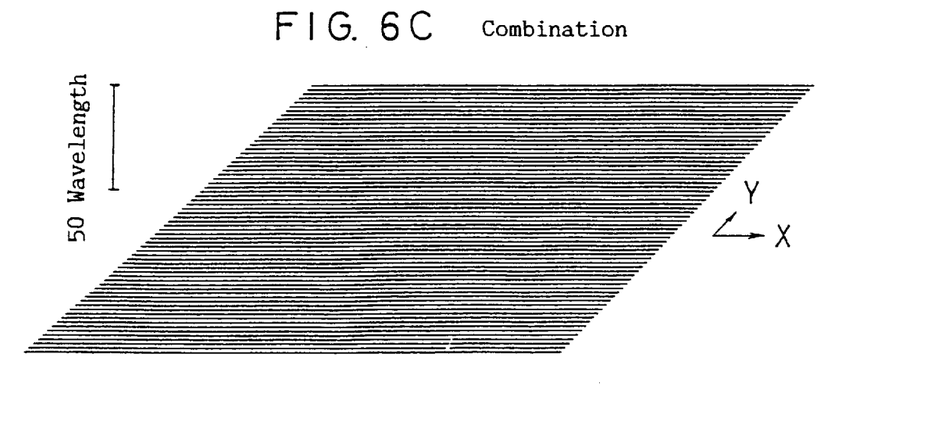

FIG. 6 shows wave front aberrations when a cylindrical reflecting mirror is combined with a toroidal reflecting mirror. More specifically, FIGS. 6A, 6B and 6C show wave front aberrations when only the cylindrical reflecting mirror is used, those when only the toroidal reflecting mirror is used, and those when both reflecting mirrors are used in combination, respectively.

Figure 7A:
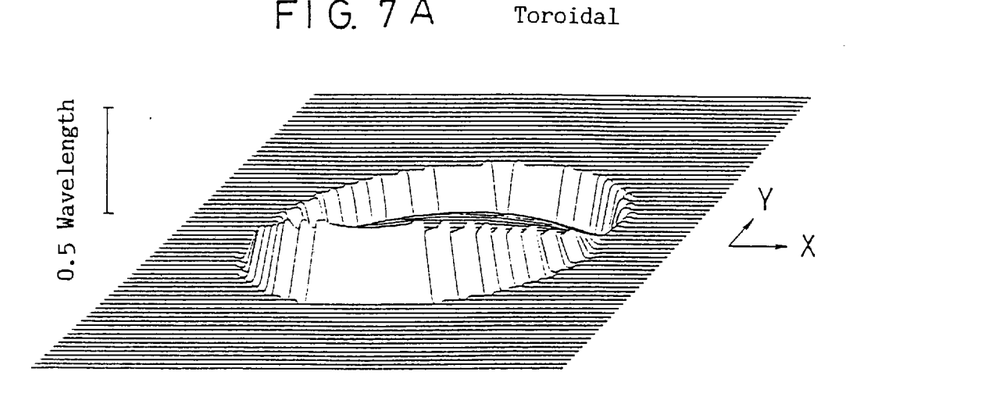
FIGS. 7A–7C show distributions of wave front aberrations of a laser beam reflected by the combination of a toroidal and a toroidal reflecting mirror.
Figure 7B:
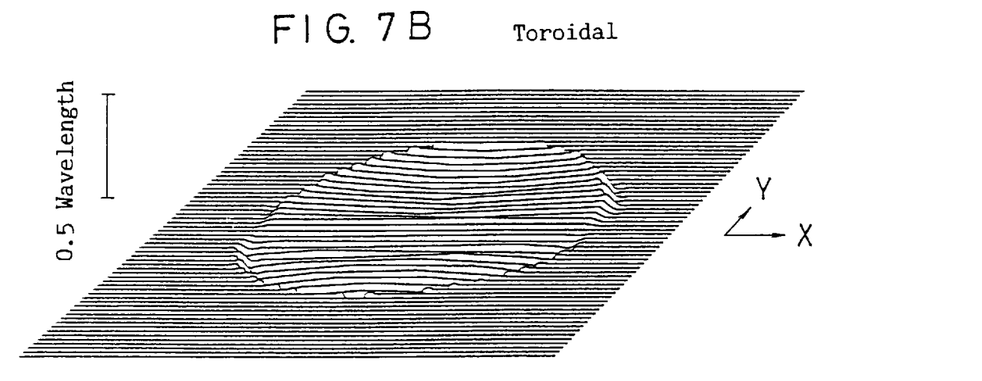
Figure 7C:
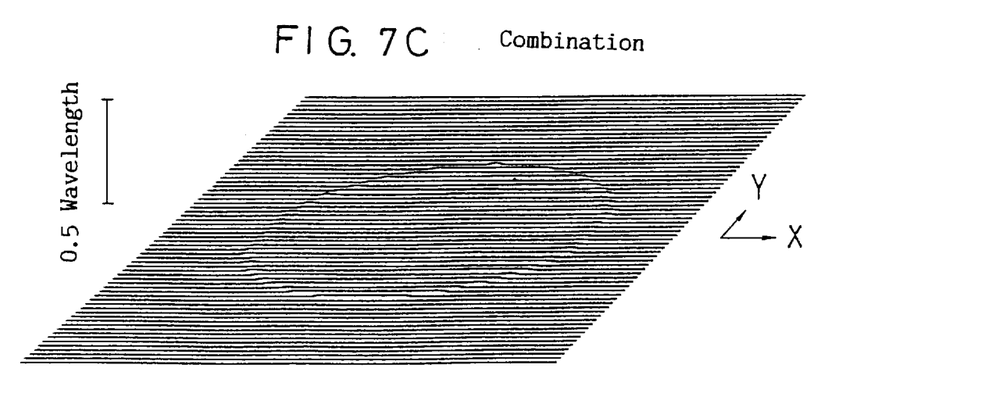

FIG. 7 shows wave front aberrations when two toroidal mirrors are used. More specifically, FIGS. 7A, 7B and 7C show wave front aberrations when one of the two toroidal mirrors is used, those when the other of them is used, and those when two toroidal mirrors were used in combination, respectively.

As mentioned earlier, one of the first and second mirrors has to be a toroidal mirror. As the other mirror, a toroidal mirror is most desirable, the second best choice being a spherical mirror, with a cylindrical mirror being the least desirable. The reason is clear from FIGS. 5, 6 and 7. Namely, the wave front aberration is the smallest with the toroidal-toroidal combination (in FIG. 7, the wave front aberration is expressed with 0.5 wavelength as one unit), the second smallest with the toroidal-spherical combination (10 wavelengths being one unit in FIG. 5), and the largest with the toroidal-cylindrical combination (50 wavelengths being one unit in FIG. 6).

A toroidal reflecting mirror is preferably used as the second reflecting mirror, because its surface shape accuracy will have a smaller influence on the wave front aberration when it is used as the second reflecting mirror than when used as the first reflecting mirror.

Figure 8:
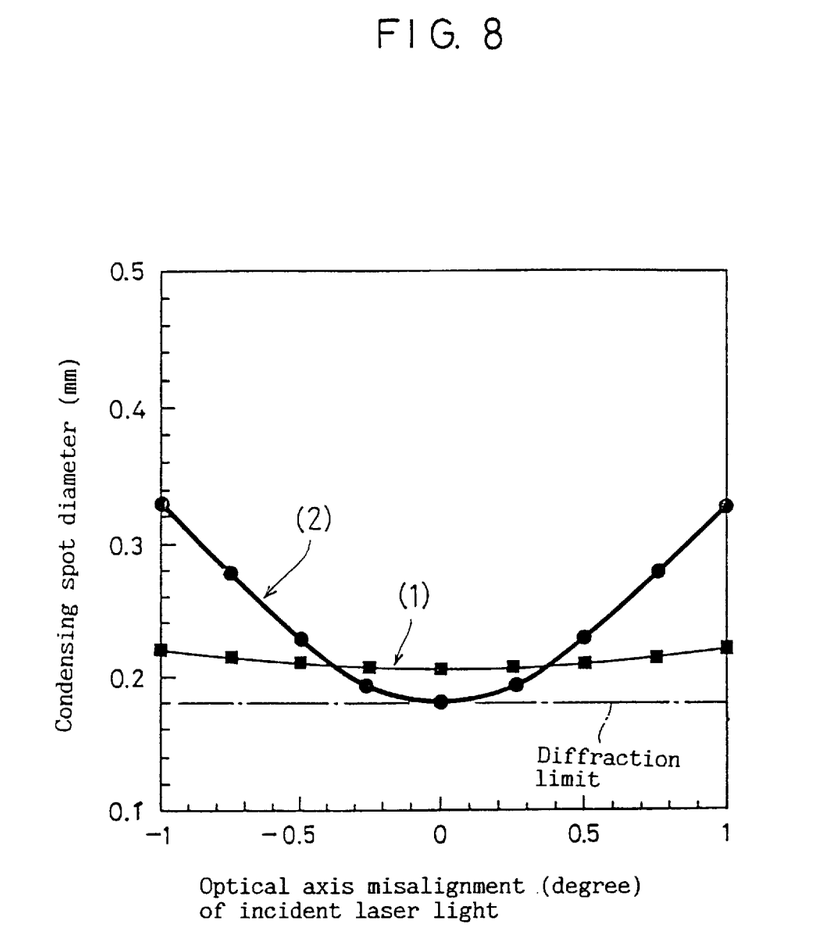
FIG. 8 is a graph showing the relationship between the amount of tilt in the optical axis of the incident laser beam and the condensed spot diameter.

FIG. 8 shows the relationship between the optical axis misalignment (tilt) and the condensing spot diameter with the beam-condensing device of the embodiment (curve (1)) and a conventional device (curve (2)). As seen in the figure, in the embodiment, the condensing spot diameter varies little even if the optical axis of the incoming laser beam is tilted slightly. Also, it is possible to focus the laser beam within as small a diameter as achieved with a conventional beam-condensing optical device that uses parabolic mirrors.

What is claimed is:

1. A method of condensing a laser beam comprising:
    reflecting an incident laser beam with a first concave reflecting mirror; and
    reflecting the laser beam reflected from said first concave reflecting mirror with a second concave reflecting mirror in the same rotational direction as said laser beam reflected from said first concave reflecting mirror so as to minimize wave front aberration,
    wherein said first and second reflecting mirrors have curved reflecting surfaces and said second mirror is selected with a radius of curvature such that any optical path differences of the laser beam reflected by said first reflecting mirror are substantially canceled out by said second reflecting mirror so that the laser beam is reflected by said second reflecting mirror with minimal wave front aberration.

2. A laser beam condensing device comprising:
    a first reflecting mirror having a concave reflecting surface; and
    a second reflecting mirror positioned relative to said first reflecting mirror so that a laser beam will be reflected by said first and second mirrors in the same rotational direction to minimize wave front aberration, said second reflecting mirror having a concave reflecting surface and one of said first and second mirrors being a toroidal mirror and the other of said first and second mirrors being one of a spherical mirror, a cylindrical mirror, and a toroidal mirror, wherein said second mirror has a radius of curvature such that any optical path differences of a laser beam reflected by said first mirror will be substantially cancelled out when the laser beam is reflected by said second mirror.

3. The laser beam condensing device as claimed in claim 2, wherein said other of said first and second reflecting mirrors is a spherical mirror.

4. The laser beam condensing device as claimed in claim 2, wherein said other of said first and second reflecting mirrors is a cylindrical mirror.

5. The laser beam condensing device as claimed in claim 2, wherein said other of said first and second reflecting mirrors is a toroidal mirror.

6. A method of condensing a laser beam with first and second concave reflecting mirrors, wherein one of said first and second concave reflecting mirrors is a toroidal mirror, the method comprising:

arranging said first and second reflecting mirrors relative to each other such that an incident laser beam will be reflected by said first and second concave reflecting mirrors by predetermined angles in the same direction; and adjusting the radii of curvature of said first and second concave reflecting mirrors so as to cancel out an optical path difference and to minimize wave front aberration of the laser beam reflected by said second reflecting mirror.

* * * * *